US007904544B2

(12) United States Patent
Migita et al.

(10) Patent No.: US 7,904,544 B2
(45) Date of Patent: Mar. 8, 2011

(54) METHOD AND APPARATUS FOR ESTIMATING DEMAND, AND COMPUTER PRODUCT

(75) Inventors: Kazuhiko Migita, Kawasaki (JP); Mitsuhiro Itsuki, Kawasaki (JP); Kazuki Shimojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 957 days.

(21) Appl. No.: 11/191,947

(22) Filed: Jul. 29, 2005

(65) Prior Publication Data

US 2006/0218270 A1    Sep. 28, 2006

(30) Foreign Application Priority Data

Mar. 25, 2005  (JP) ................................. 2005-088802

(51) Int. Cl.
*G06F 15/173* (2006.01)
(52) U.S. Cl. ......... 709/224; 709/223; 709/225; 709/226; 705/10
(58) Field of Classification Search .......... 709/223–226; 705/10
See application file for complete search history.

(56) References Cited

U.S. PATENT DOCUMENTS

| 5,491,629 | A  | * | 2/1996  | Fox et al. ........................... 702/3   |
| 6,086,618 | A  | * | 7/2000  | Al-Hilali et al. ................... 703/2     |
| 6,463,454 | B1 | * | 10/2002 | Lumelsky et al. ............. 718/105          |
| 6,466,980 | B1 |   | 10/2002 | Lumelsky et al.                                |
| 6,763,277 | B1 | * | 7/2004  | Allen et al. ..................... 700/100     |
| 6,876,988 | B2 | * | 4/2005  | Helsper et al. ................... 706/21      |
| 6,973,415 | B1 | * | 12/2005 | Saghier et al. ................. 702/186       |
| 6,993,494 | B1 | * | 1/2006  | Boushy et al. ................... 705/10       |
| 7,072,960 | B2 | * | 7/2006  | Graupner et al. ............. 709/223          |
| 7,212,978 | B2 | * | 5/2007  | Kowal et al. ........................ 705/5    |
| 7,328,166 | B1 | * | 2/2008  | Geoghegan et al. .............. 705/5          |
| 7,373,221 | B2 | * | 5/2008  | Lal ................................ 700/291   |
| 2002/0120492 | A1 | * | 8/2002 | Phillips et al. .................. 705/10      |
| 2002/0174436 | A1 |   | 11/2002 | Wu et al.                                     |
| 2003/0037145 | A1 | * | 2/2003 | Fagan ........................... 709/226       |
| 2003/0171963 | A1 | * | 9/2003 | Kurihara et al. .................. 705/7       |
| 2004/0138932 | A1 | * | 7/2004 | Johnson et al. ................... 705/7       |
| 2004/0215545 | A1 | * | 10/2004 | Murakami et al. ............. 705/36           |
| 2004/0225556 | A1 | * | 11/2004 | Willen et al. .................... 705/10      |

(Continued)

FOREIGN PATENT DOCUMENTS

JP    1998-187320  A    7/1998

(Continued)

OTHER PUBLICATIONS

Japanese Office Action mailed by JPO in connection with corresponding JP Patent Application No. 2008-088802, on Jan. 15, 2010. Partial English-language translation provided.

(Continued)

*Primary Examiner* — Alina N. Boutah
(74) *Attorney, Agent, or Firm* — Fujitsu Patent Center

(57) ABSTRACT

An apparatus for estimating a demand for a service offered via a network includes an external-factor storing unit that stores an event for a case in which information relating to the service appears in a predetermined information source on the network, as an external factor affecting the demand; a demand-amount calculating unit that calculates an amount of the demand for the service by determining whether the event as the external factor stored is appeared in the predetermined information source; and a resource-change instructing unit that instructs a change of a resource allocated to the service, according to the amount of the demand calculated.

18 Claims, 13 Drawing Sheets

EXTERNAL-FACTOR TABLE
12a

| SERVICE | INFORMATION SOURCE | FACTORS | CORRELATION CO-EFFICIENT |
|---|---|---|---|
| PORTAL SITE OF COMPANY A | NATIONAL NEWS SITE(http://www.zennkokunews.com) | 1: COMPANY NAME OF COMPANY A APPEARS IN HEADLINES. | 3.0 |
| | LOCAL NEWS SITE (http://www.chihounews.com) | 2: COMPANY NAME OF COMPANY A APPEARS IN HEADLINES. | 1.5 |
| | SEARCH SITE (http://www.kensaku.com) | 3: COMPANY A IS IN THE TOP THREE IN THE LOW-PRICE RANKING OF PRODUCT X. | 2.0 |
| | SEARCH SITE (http://www.kensaku.com) | 4: COMPANY A IS IN THE TOP TEN IN THE LOW-PRICE RANKING OF PRODUCT X. | 1.0 |
| | PRICE COMPARISON SITE (http://www.kakakuhikaku.com) | 5: COMPANY A IS IN THE TOP THREE IN THE LOW-PRICE RANKING OF PRODUCT X. | 1.5 |
| | ... | ... | ... |
| SHOPPING SITE OF COMPANY S | PRICE COMPARISON SITE (http://www.kakakuhikaku.com) | 1: COMPANY S IS IN THE TOP THREE IN THE LOW-PRICE RANKING OF PRODUCT Y. | 2.0 |
| | PRICE COMPARISON SITE (http://www.kakakuhikaku.com) | 2: COMPANY S IS IN THE TOP TEN IN THE LOW-PRICE RANKING OF PRODUCT Y. | 1.5 |
| | NATIONAL NEWS SITE(http://www.zennkokunews.com) | 3: COMPANY NAME OF COMPANY S APPEARS IN HEADLINES. | 2.0 |
| | ... | ... | ... |
| WEATHER FORECAST SITE OF COMPANY W | SEARCH SITE (http://www.kensaku.com) | 1: COMPANY W IS IN THE TOP THREE IN THE SEARCH RANKING OF TYPHOON INFORMATION. | 2.0 |
| | SEARCH SITE (http://www.kensaku.com) | 2: COMPANY W IS IN THE TOP TEN IN THE LOW-PRICE RANKING OF TYPHOON INFORMATION. | 1.5 |
| | ... | ... | ... |

U.S. PATENT DOCUMENTS

| | | | |
|---|---|---|---|
| 2005/0210262 A1* | 9/2005 | Rolia et al. | 713/182 |
| 2005/0246432 A1* | 11/2005 | Iijima et al. | 709/223 |
| 2006/0059253 A1* | 3/2006 | Goodman et al. | 709/223 |
| 2006/0074970 A1* | 4/2006 | Narayanan et al. | 707/102 |
| 2008/0091480 A1* | 4/2008 | Geoghegan et al. | 705/5 |

FOREIGN PATENT DOCUMENTS

| | | |
|---|---|---|
| JP | 2001-067377 | 3/2001 |
| JP | 2001-067377 A | 3/2001 |
| JP | 2002-108937 A | 4/2002 |
| JP | 2002-163241 A | 6/2002 |
| JP | 2002-222302 A | 8/2002 |
| JP | 2002-251505 A | 9/2002 |
| JP | 2003-346070 | 12/2003 |
| JP | 2004-005208 A | 1/2004 |
| JP | 2004-272674 | 9/2004 |

OTHER PUBLICATIONS

Japan Patent Office: "Japanese Office Action", mailed Dec. 21, 2010 for corresponding JP Patent Application No. 2005-088802, with partial English-language translation.

* cited by examiner

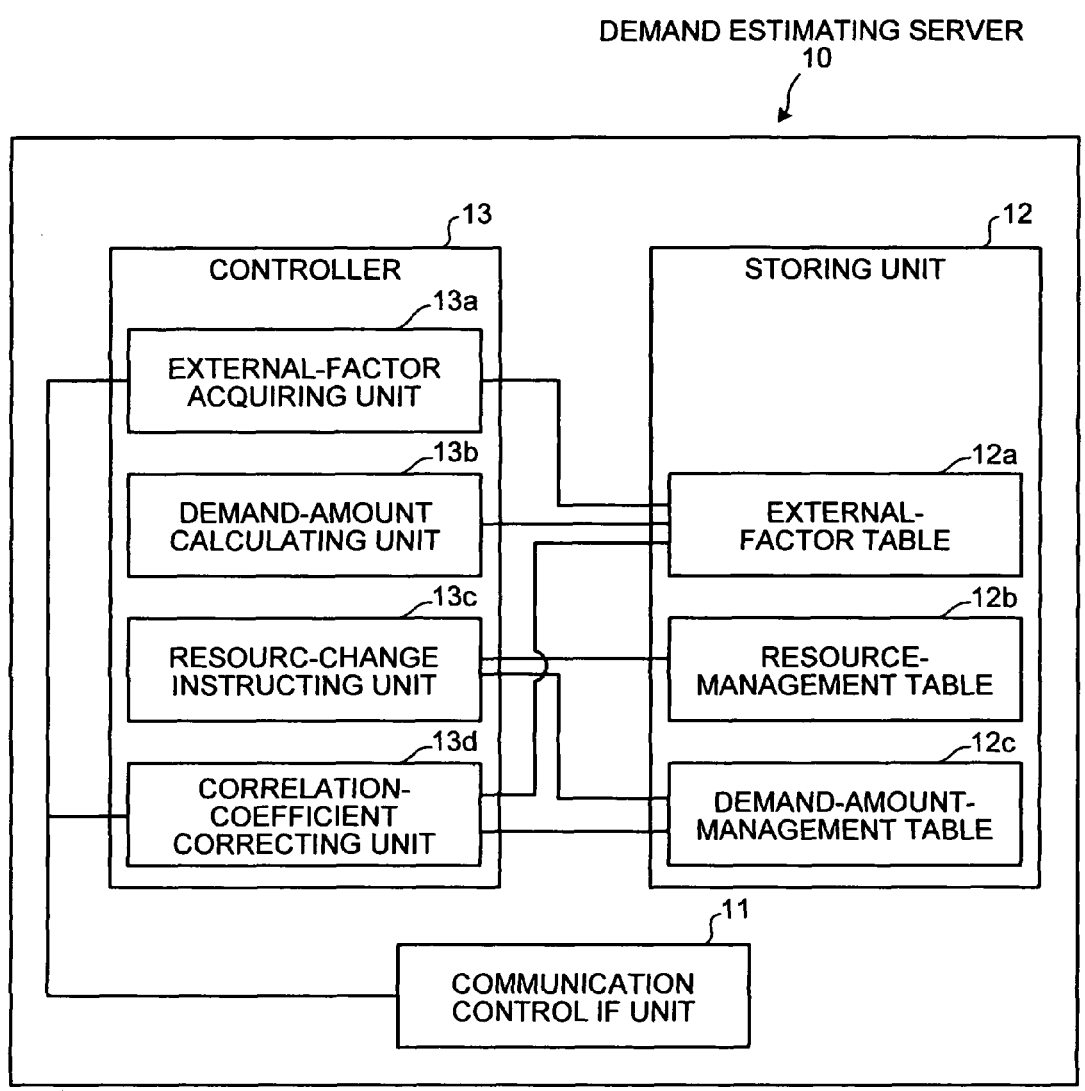

FIG.3

EXTERNAL-FACTOR TABLE  
12a

| SERVICE | INFORMATION SOURCE | FACTORS | CORRELATION CO-EFFICIENT |
|---|---|---|---|
| PORTAL SITE OF COMPANY A | NATIONAL NEWS SITE(http://www.zennkokunews.com) | 1: COMPANY NAME OF COMPANY A APPEARS IN HEADLINES. | 3.0 |
| | LOCAL NEWS SITE (http://www.chihounews.com) | 2: COMPANY NAME OF COMPANY A APPEARS IN HEADLINES. | 1.5 |
| | SEARCH SITE (http://www.kensaku.com) | 3: COMPANY A IS IN THE TOP THREE IN THE LOW-PRICE RANKING OF PRODUCT X. | 2.0 |
| | SEARCH SITE (http://www.kensaku.com) | 4: COMPANY A IS IN THE TOP TEN IN THE LOW-PRICE RANKING OF PRODUCT X. | 1.0 |
| | PRICE COMPARISON SITE (http://www.kakakuhikaku.com) | 5: COMPANY A IS IN THE TOP THREE IN THE LOW-PRICE RANKING OF PRODUCT X. | 1.5 |
| | ... | ... | ... |
| SHOPPING SITE OF COMPANY S | PRICE COMPARISON SITE (http://www.kakakuhikaku.com) | 1: COMPANY S IS IN THE TOP THREE IN THE LOW-PRICE RANKING OF PRODUCT Y. | 2.0 |
| | PRICE COMPARISON SITE (http://www.kakakuhikaku.com) | 2: COMPANY S IS IN THE TOP TEN IN THE LOW-PRICE RANKING OF PRODUCT Y. | 1.5 |
| | NATIONAL NEWS SITE(http://www.zennkokunews.com) | 3: COMPANY NAME OF COMPANY S APPEARS IN HEADLINES. | 2.0 |
| | ... | ... | ... |
| WEATHER FORECAST SITE OF COMPANY W | SEARCH SITE (http://www.kensaku.com) | 1: COMPANY W IS IN THE TOP THREE IN THE SEARCH RANKING OF TYPHOON INFORMATION. | 2.0 |
| | SEARCH SITE (http://www.kensaku.com) | 2: COMPANY W IS IN THE TOP TEN IN THE LOW-PRICE RANKING OF TYPHOON INFORMATION. | 1.5 |
| | ... | ... | ... |
| | ... | ... | ... |

FIG.4

EXTERNAL-FACTOR TABLE
12b

| SERVICE | ESTIMATED DMAND AMOUNT | RESOURCE TYPE |
|---|---|---|
| PORTAL SITE OF COMPANY A | 1.0 ~ 1.4 | TYPE 1 (2 WEB SERVERS, 2 AP SERVERS, STORAGE 1.0 GB, ...) |
| CURRENT RESOURCE: TYPE 1 | 1.5 ~ 1.9 | TYPE 2 (3 WEB SERVERS, 3 AP SERVERS, STORAGE 1.5 GB, ...) |
| | 2.0 ~ 2.9 | TYPE 3 (4 WEB SERVERS, 3 AP SERVERS, STORAGE 2.0 GB, ...) |
| | ... | ... |
| SHOPPING SITE OF COMPANY S | 1.0 ~ 1.4 | TYPE 1 (2 WEB SERVERS, 2 AP SERVERS, STORAGE 1.0 GB, ...) |
| CURRENT RESOURCE: TYPE 2 | ... | ... |
| WEATHER FORECAST SITE OF COMPANY W | 1.0 ~ 1.4 | TYPE 1 (2 WEB SERVERS, 2 AP SERVERS, STORAGE 1.0 GB, ...) |
| CURRENT RESOURCE: TYPE 4 | ... | ... |
| ... | ... | ... |

FIG.5

EXTERNAL-FACTOR TABLE
12c

| SERVICE | DATE AND TIME | ESTIMATED DEMAND AMOUNT | ACTUAL DEMAND AMOUNT |
|---|---|---|---|
| PORTAL SITE OF COMPANY A | ... | ... | ... |
| | 2005.04.04.12:00 | 2 . 5 (FACTORS 2, 4) | 5 . 0 |
| | ... | ... | ... |
| SHOPPING SITE OF COMPANY S | ... | ... | ... |
| | 2005.04.04.12:00 | 1 . 5 (FACTORS 2) | 1 . 8 |
| | ... | ... | ... |
| WEATHER FORECAST SITE OF COMPANY W | ... | ... | ... |
| | 2005.04.04.12:00 | 3 . 5 (FACTORS 1, 4) | 3 . 6 |
| | ... | ... | ... |
| ... | ... | ... | ... |

FIG.6

| SERVICE | ESTIMATED DEMAND AMOUNT |
|---|---|
| PORTAL SITE OF COMPANY A | 1 . 5 + 1 . 0 = 2 . 5 |
| SHOPPING SITE OF COMPANY S | 1 . 5 |
| WEATHER FORECAST SITE OF COMPANY W | 2 . 0 + 1 . 5 = 3 . 5 |
| .... | ... |

FIG.7

| SERVICE | CURRENT RESOURCES | ESTIMATED RESOURCES | CHANGE INSTRUCTION |
|---|---|---|---|
| PORTAL SITE OF COMPANY A | TYPE 1 | TYPE 3 | YES |
| SHOPPING SITE OF COMPANY S | TYPE 2 | TYPE 2 | NO |
| WEATHER FORECAST SITE OF COMPANY W | TYPE 4 | TYPE 4 | NO |
| ... | ... | ... | ... |

FIG.8

| SERVICE | ESTIMATED DEMAND AMOUNT | ACTUAL DEMAND AMOUNT | EXECUTE CORRECTION |
|---|---|---|---|
| PORTAL SITE OF COMPANY A | 2.5 | 5.0 | YES |
| SHOPPING SITE OF COMPANY S | 1.5 | 1.8 | NO |
| WEATHER FORECAST SITE OF COMPANY W | 3.5 | 3.6 | NO |
| ... | ... | ... | ... |

FIG.9

| SERVICE | FACTOR | CORRELATION COEFFICIENT BEFORE CORRECTION | CORRELATION COEFFICIENT AFTER CORRECTION |
|---|---|---|---|
| PORTAL SITE OF COMPANY A | 2 | 1.5 | 3.0 |
|  | 4 | 1.0 | 2.0 |
|  | TOTAL | 2.5 | ACTUAL DEMAND AMOUNT:5.0 |

FIG.12

EXTERNAL-FACTOR TABLE
12a

| SERVICE | INFORMATION SOURCE | ACCESS TIMING | FACTOR | CORRE-CO-EFFICIENT |
|---|---|---|---|---|
| PORTAL SITE OF COMPANY A | NATIONAL NEWS SITE ( http://www.zennkokunews.com ) | A M 1、A M 7、P M 1、P M 7 | | |
| | LOCAL NEWS SITE ( http://www.chihounews.com ) | A M 1、A M 7、P M 1、P M 7 | | |
| | SEARCH SITE ( http://www.kensaku.com ) | A M 0、A M 9、P M 6 | | |
| | SEARCH SITE ( http://www.kensaku.com ) | A M 0、A M 9、P M 6 | | |
| | PRICE COMPARISON SITE ( http://www.kakakuhikaku.com ) | A M 6、P M 6 | | |
| | ... | ... | | |
| ... | ... | ... | | |

FIG.13

EXTERNAL-FACTOR TABLE
12b

| SERVICE | ESTIMATED DEMAND AMOUNT | RESOURCE TYPE | INQUIRY AT THE TIME OF CHANGE |
|---|---|---|---|
| PORTAL SITE OF COMPANY A  CURRENT RESOURCE  TYPE 1 | 1 . 0 ~ 1 . 4 | TYPE 1 | NOT NECESSARY |
| | 1 . 5 ~ 1 . 9 | TYPE 2 | NOT NECESSARY |
| | 2 . 0 ~ 2 . 9 | TYPE 3 | NECESSARY ( xxx@yyy.zzz ) |
| | ... | ... | ... |
| ... | ... | ... | ... |

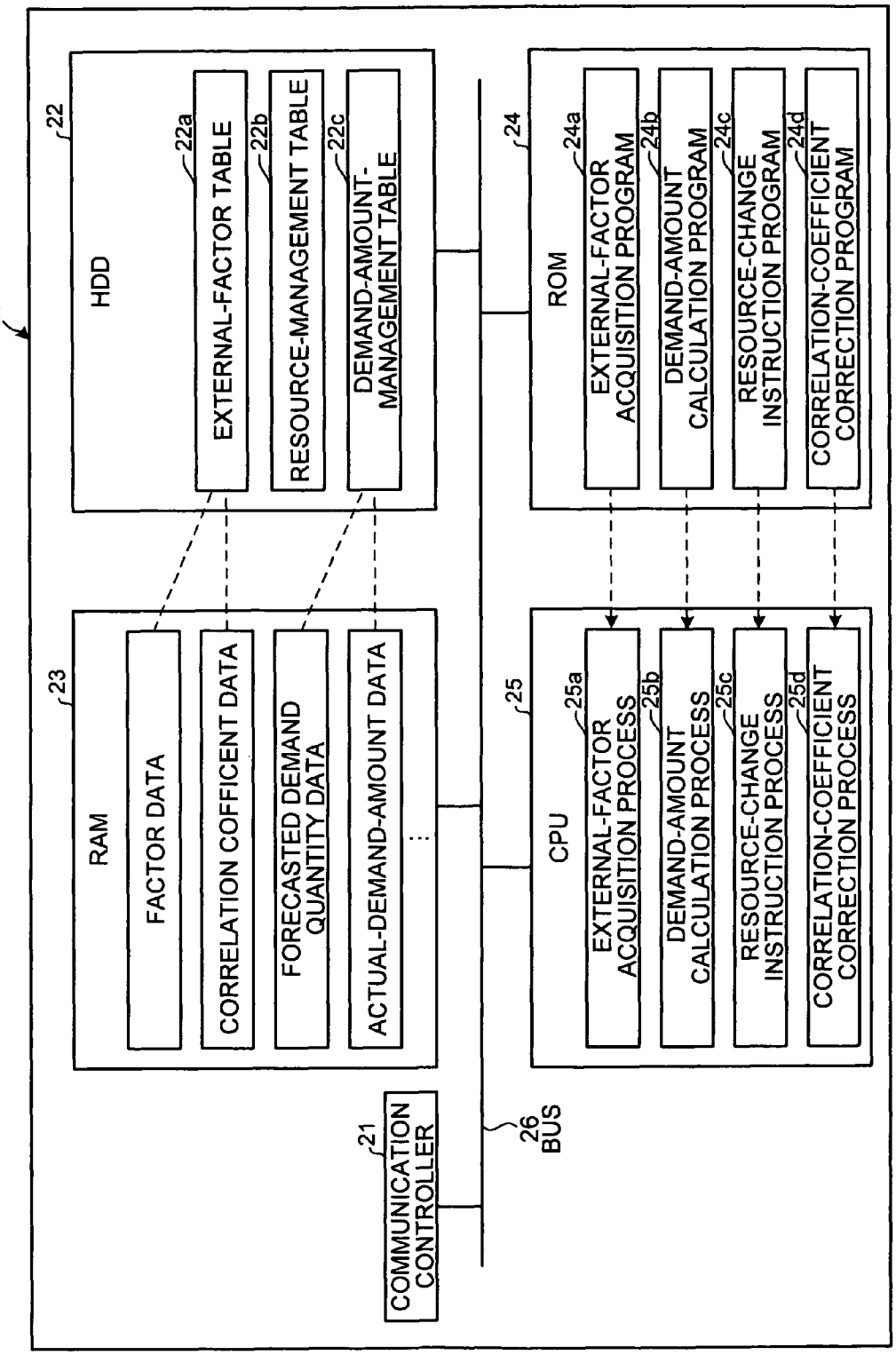

METHOD AND APPARATUS FOR ESTIMATING DEMAND, AND COMPUTER PRODUCT

BACKGROUND OF THE INVENTION

1. Field of the Invention

The present invention relates to a technology for estimating a demand for a service offered on a network.

2. Description of the Related Art

Conventionally, various services (such as, portal sites, shopping sites, or weather forecasting sites of a certain company) have been offered to users on the network. Demands for such services seasonally change. However, in order to avoid losses such as one caused by insufficient resources (for example, the number of Web servers and application (AP) servers, and the storage size) during a season and one caused by excessive resources out of a season, it is important to allocate an appropriate amount of resources to the services according to the demands for the services (the number of access by users) in view of operation of the services.

When the content of resources is changed according to the demands for the service, the resource changing operation takes a few minutes to several tens of minutes. Therefore, in view of operation of services, it is essential to start the resource changing operation before the demands vary, by estimating the demands, in order to allocate adequate resources at the right time corresponding to the demands. Accordingly, for example, a technique for estimating demands based on past results of demands has been developed (see, for example, Japanese Patent Application Laid-open No. 2001-67377).

However, there is a problem in that the conventional technique cannot follow the current demands, which changes fast in a complicated manner. That is, in the current network society, the demands of users are affected by information released on the Internet (for example, when a product of a certain company appears on a news site, the number of accesses to the company's website increases immediately). Therefore, the conventional technique for estimating the demands based on the past results of demands cannot handle the fluctuations in the demands specific to the network. As a result, the conventional technique cannot follow today's demands that change fast in a complicated manner.

SUMMARY OF THE INVENTION

It is an object of the present invention to at least solve the problems in the conventional technology.

An apparatus for estimating a demand for a service offered via a network, according to one aspect of the present invention, includes an external-factor storing unit that stores an event for a case in which information relating to the service appears in a predetermined information source on the network, as an external factor affecting the demand; a demand-amount calculating unit that calculates an amount of the demand for the service by determining whether the event as the external factor stored is appeared in the predetermined information source; and a resource-change instructing unit that instructs a change of a resource allocated to the service, according to the amount of the demand calculated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram of a demand-estimating server;

FIG. 3 is an example of information stored in an external-factor table;

FIG. 4 is an example of information stored in a resource-management table;

FIG. 5 is an example of information stored in a demand-amount-management table;

FIG. 6 is an example of calculation of demand amount;

FIG. 7 is an example of a resource changing instruction;

FIG. 8 is an example of correction of a correlation coefficient;

FIG. 9 is another example of correction of the correlation coefficient;

FIG. 12 is another example of information stored in the external-factor table;

FIG. 13 is another example of information stored in the resource-management table;

FIG. 17 depicts a computer that executes a demand-estimating program.

DETAILED DESCRIPTION OF THE PREFERRED EMBODIMENTS

Exemplary embodiments of the present invention will be explained in detail below with reference to the accompanying drawings. The exemplary embodiments are divided into a first embodiment and a second embodiment, and the embodiments explain a demand-estimating server to which the present invention is applied.

The configuration of the demand-estimating server according to the first embodiment, the flow of the demand estimating processing according to the first embodiment, the flow of correlation-coefficient correction processing according to the first embodiment, and the effects of the first embodiment will be explained sequentially, after explaining a concept of demand estimating according to the first embodiment.

Figure 1:
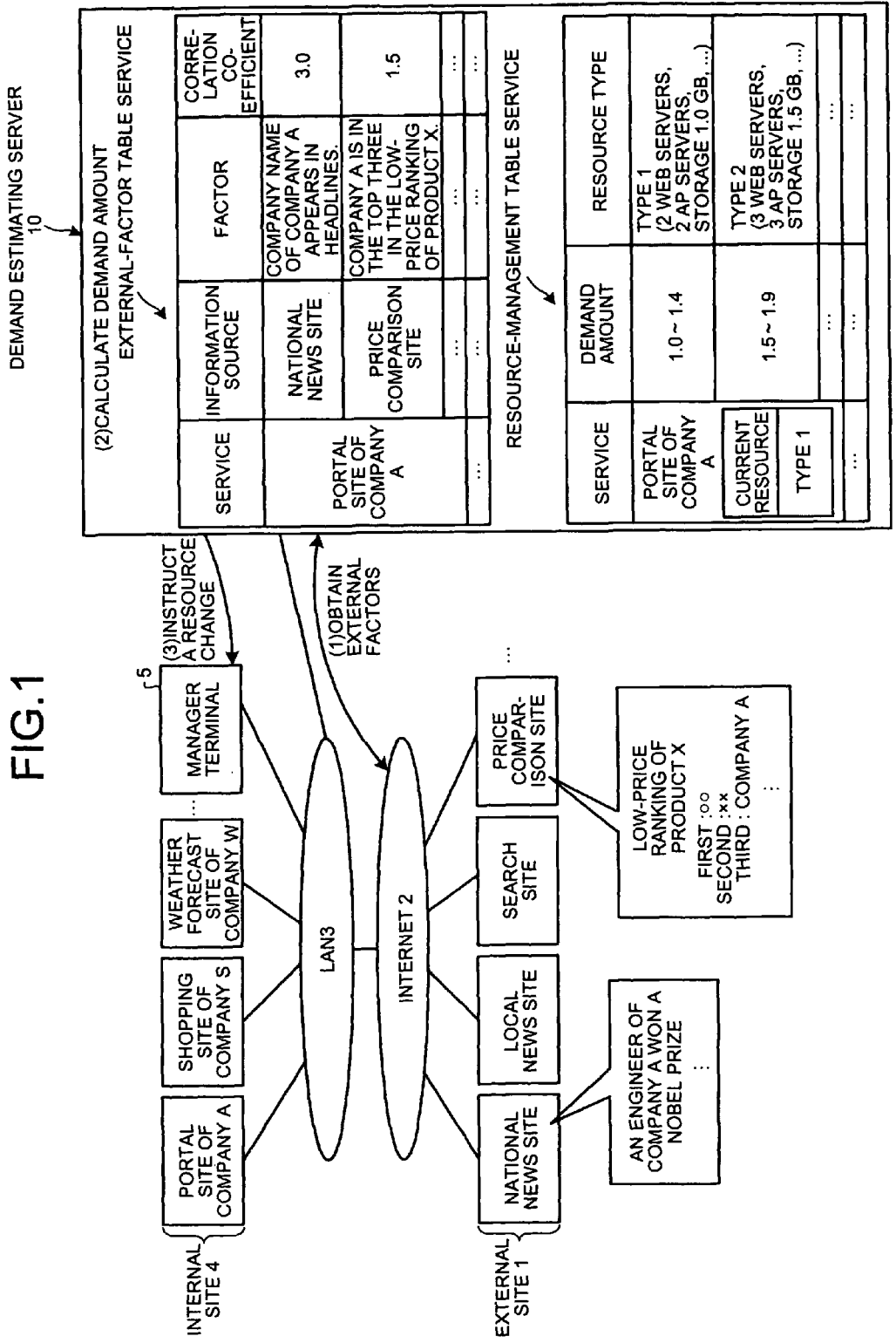
FIG. 1 is a diagram for explaining a concept of demand estimating according to a first embodiment of the present invention.

FIG. 1 is a diagram for explaining a concept of demand estimating according to the first embodiment. A demand-estimating server 10 according to the first embodiment is a server of a network provider, which manages an internal site 4 (for example, sites for offering a service to users on the network, such as a portal site of company A, a shopping site of company S, a weather estimate site of company W), connected thereto via a local area network (LAN) 3.

The outline of the demand-estimating server 10 is to estimate the demands of users with respect to the internal site 4 (that is, the number of access to the site), and output a change instruction of resources allocated to respective services to a manager terminal 5, based on the estimate of the demands (the amount of estimated demands). That is, for example, when it is estimated that demands for the portal site of company A will increase, the demand-estimating server 10 outputs a change instruction to increase the resources allocated to the portal site of company A (for example, the number of Web servers and AP servers, the storage size, and the like) to the manager terminal 5. The respective sites in the internal site 4 correspond to "services offered on a network" in the appended claims.

The main feature of the demand-estimating server 10 is in the demand estimating method with respect to these services, and specifically, the demand-estimating server 10 can handle fluctuations in the demands, specific to the network. That is, in the current network society, demands of users are likely affected by the information appearing on the Internet (for example, when a product of a certain company appears on a news site, the number of accesses to the company's website increases immediately). Accordingly, the demand-estimating server 10 according to the first embodiment has a main feature in that demand estimating is possible corresponding to fluctuations in demands specific to the network.

As shown in FIG. 1, to the Internet 2 is connected to various kinds of external sites 1 (for example, national news site, local news site, search site, price comparison site, and the like), as external factors affecting the demands for the internal site 4. That is, as an example, when news informing "Mr. XXX, an engineer of company A won a Nobel Prize" appears on a national news site, which is in the external site 1, or when product X of company A is ranked in the top three in a low price ranking of the product X in the price comparison site, demands for the portal site of company A, which is in the internal site 4, will increase.

Therefore, the demand-estimating server 10 according to the first embodiment pre-stores an event when information relating to a service appears in a predetermined information source on the network, and a correlation coefficient indicating the influence thereof with respect to the demands in an external-factor table, as an external factor affecting the demands for the service in the internal site 4. That is, as an example, events such as "the company name of company A appears in the headlines on the national news site", and "company A is ranked in the top three in a low price ranking of the product X in the price comparison site" are managed in the external-factor table as the external factors of the portal site of company A, together with the correlation coefficient.

The demand-estimating server 10 according to this embodiment pre-stores information of a resource type (that is, the number of Web servers and AP servers, the storage size, and the like) corresponding to the respective estimated demand quantities in a resource-management table, for each predetermined range of demand amount. As shown in FIG. 1, information of the resource type actually set in respective services in the internal site 4 is also stored in the resource-management table.

The demand-estimating server 10 having such a table accesses the external site 1 (information source) specified in the external-factor table for every predetermined time (for example, every 10 minutes), and determines whether the factor (event) specified in the external-factor table has appeared, to calculate the demand amount. That is, for example, the demand-estimating server 10 accesses the "national news site" or the "price comparison site", to determine whether the name of company A appears in the headlines in the "national news site", or whether company A is ranked in the top three in a low price ranking of the product X in the price comparison site. When the name of company A appears in both cases, the respective correlation coefficients specified in the external-factor table are added, to calculate the demand amount (for example, correlation coefficient "3.0"+correlation coefficient "1.5"=demand amount "4.5").

Subsequent to calculation of the demand amount, the demand-estimating server 10 refers to the resource-management table to determine whether a resource type corresponding to the demand amount has been actually set. When the appropriate resource type has not been set, a change instruction indicating that the resource type should be changed to the one corresponding to the demand amount is output to the manager terminal 5. For example, as shown in FIG. 1, when "1.8" is calculated as the demand amount of the portal site of company A, but the resource type actually set is "1", a change instruction indicating that the resource type should be changed to "2" corresponding to the demand amount "1.8" is output to the manager terminal 5.

Thus, the demand-estimating server 10 according to the first embodiment stores the events in which information relating to services appears in a certain information source on the network in the external-factor table, as external factors affecting the demands for the services (respective sites in the internal site 4) on the network. The demand-estimating server 10 determines whether such a situation has appeared, as the external factor to calculate the demand amount, and instructs a resource change corresponding to the calculated demand amount. Therefore, for example, even when a product of a certain company appears on a news site and the number of accesses to the company's website increases suddenly, the demand-estimating server 10 can handle the fluctuations in demands specific to the network by immediately instructing to increase the resources allocated to the site.

FIG. 2 is a block diagram of a demand-estimating server 10. FIG. 3 is an example of information stored in the external-factor table. FIG. 4 is an example of information stored in the resource-management table. FIG. 5 is an example of information stored in a demand-amount-management table. FIG. 6 is an example of calculation of demand amount. FIG. 7 is an example of a resource change instruction. FIG. 8 is an example of correction of a correlation coefficient. FIG. 9 is another example of correction of the correlation coefficient.

The demand-estimating server 10 according to the first embodiment is a server computer held by a network provider who offers the internal site 4. As shown in FIG. 2, the demand-estimating server 10 is configured by connecting a communication control interface (IF) unit 11, a storing 12, and a controller 13 by a predetermined wire. The communication control IF unit 11 controls communication performed between various devices via the network (the Internet 2 or the LAN 3), and for example, performs control for accessing the external site 1 to receive an external factor or control for transmitting a resource change instruction to the manager terminal 5.

The storing 12 stores data and programs necessary for various types of processing performed by the controller 13. As shown in FIG. 2, the storing 12 includes an external-factor table 12a, a resource-management table 12b, and a demand-amount-management table 12c, as those closely related to the present invention. The external-factor table 12a corresponds to an "external-factor storing unit" in the appended claims.

The external-factor table 12a stores information according to the external factor affecting demands for the services in the internal site 4, and specifically, as shown in FIG. 3, stores events (factors) when information relating to a service appears in a certain information source on the network, in association with the correlation coefficient indicating the influence of each event on the demands, for each service offered in the internal site 4.

The information stored in the external-factor table 12a is set by the network provider via the manager terminal 5. Specifically, as the influence on the demands increases, a larger correlation coefficient is provided to the event. In other words, as shown in FIG. 3, events are divided according to the size and type of the information source (for example, national site, local site, major website having a large number of accesses, medium sized website having a moderate number of accesses, news site, search site, price comparison site, and the like), and a large correlation coefficient is provided to the events in the information source having a large number of accesses. Such a correlation coefficient is automatically corrected as described later.

The resource-management table 12b stores information relating to the resources used for the services in the internal site 4. Specifically, as shown in FIG. 4, the resource-management table 12b stores information of a resource type actually set for each service offered in the internal site 4, and also stores information of a resource type (that is, number of Web servers and AP servers, the storage size, and the like) corresponding to the respective demand amount for each predetermined range of the demand amount. The demand amount and the resource type stored in the resource-management table 12b are set by the network provider via the manager terminal 5.

The demand-amount-management table 12c stores information relating to the quantity demanded with respect to the services in the internal site 4. Specifically, as shown in FIG. 5, the demand-amount-management table 12c stores the demand amount (including identification information of the external factor used for estimating) calculated by the demand estimating processing, associated with the actual demand amount on the estimated date and time for each service offered in the internal site 4. The demand amount and the actual demand amount stored in the demand-amount-management table 12c are registered by the processing of the controller 13.

The controller 13 has an internal memory for storing programs specifying various processing procedures and control data, and executes various types of processing. Particularly, as units closely related to the present invention, as shown in FIG. 2, the controller 13 includes an external-factor acquiring unit 13a, a demand-amount calculating unit 13b, a resource-change instructing unit 13c, and a correlation-coefficient correcting unit 13d. The external-factor acquiring unit 13a and the demand-amount calculating unit 13b correspond to a "demand-amount calculating unit" in the appended claims.

The external-factor acquiring unit 13a acquires information of external factors that affect the demands for the services in the internal site 4. Specifically, the external-factor acquiring unit 13a accesses the external site 1 (information source) specified in the external-factor table 12a for every predetermined time (for example, every 10 minutes) to acquire the content of the information source as the external factor. That is, as an example, the external-factor acquiring unit 13a accesses the "national news site" to acquire the "headlines", or accesses the "price comparison site" to acquire the "low price ranking of the product X".

The demand-amount calculating unit 13b calculates the demand amount for the services based on the external factors acquired by the external-factor acquiring unit 13a. Specifically, the demand-amount calculating unit 13b determines whether the factor (event) specified in the external-factor table 12a has appeared in the information source, and calculates the demand amount based on the correlation coefficient of the corresponding external factor. That is, for the portal site of company A as an example, as shown in FIG. 6, when "the name of company A has appeared in the headlines in a local news site", and "company A is in the top ten in the search ranking of the product X in the search site", the respective correlation coefficients "1.5" and "1.0" specified in the external-factor table are added together, to calculate the demand amount "2.5". The demand-amount calculating unit 13b resisters the calculated demand amount in the demand-amount-management table 12c.

The resource-change instructing unit 13c instructs a change of the resource allocated to the service corresponding to the demand amount calculated by the demand-amount calculating unit 13b. Specifically, the resource-change instructing unit 13c refers to the resource-management table 12b to determine whether the resource type corresponding to the demand amount is actually set, and when the resource type is not actually set, the resource-change instructing unit 13c outputs a change instruction indicating that the resource type should be changed to the one corresponding to the demand amount to the manager terminal 5. For example, as shown in FIG. 7, when "2.5" is calculated as the demand amount with respect to the portal site of company A, and the corresponding resource type is "3", but the actually set resource type is "1", the resource-change instructing unit 13c outputs a change instruction to change the resource type of the portal site of company A to "3" to the manager terminal 5. The resource-change instructing unit 13c updates and registers the resource type based on the change instruction as the current resource type, together with the change instruction of the resource type, in the resource-management table 12b.

The correlation-coefficient correcting unit 13d corrects the correlation coefficient stored in the external-factor table 12a. Specifically, when having obtained the actual demand amount on the estimated date and time of the demand amount registered in the demand-amount-management table 12c from the internal site 4 or the manager terminal 5, the correlation-coefficient correcting unit 13d registers the actual demand amount in the demand-amount-management table 12c, and determines whether there is a predetermined difference (for example, a difference exceeding "1.0") between the demand amount and the actual demand amount. For the service having a predetermined difference, as shown in FIG. 8, the correlation coefficient is corrected. As shown in FIG. 9, the correction is performed such that the sum total of corrected new correlation coefficients agree with the actual demand amount, by weight-distributing the difference (the difference between the demand amount and the actual demand amount) to the respective correlation coefficients of the factors having affected the calculation of the demand amount. The correlation-coefficient correcting unit 13d updates and registers the corrected new correlation coefficients in the external-factor table 12a.

Figure 10:
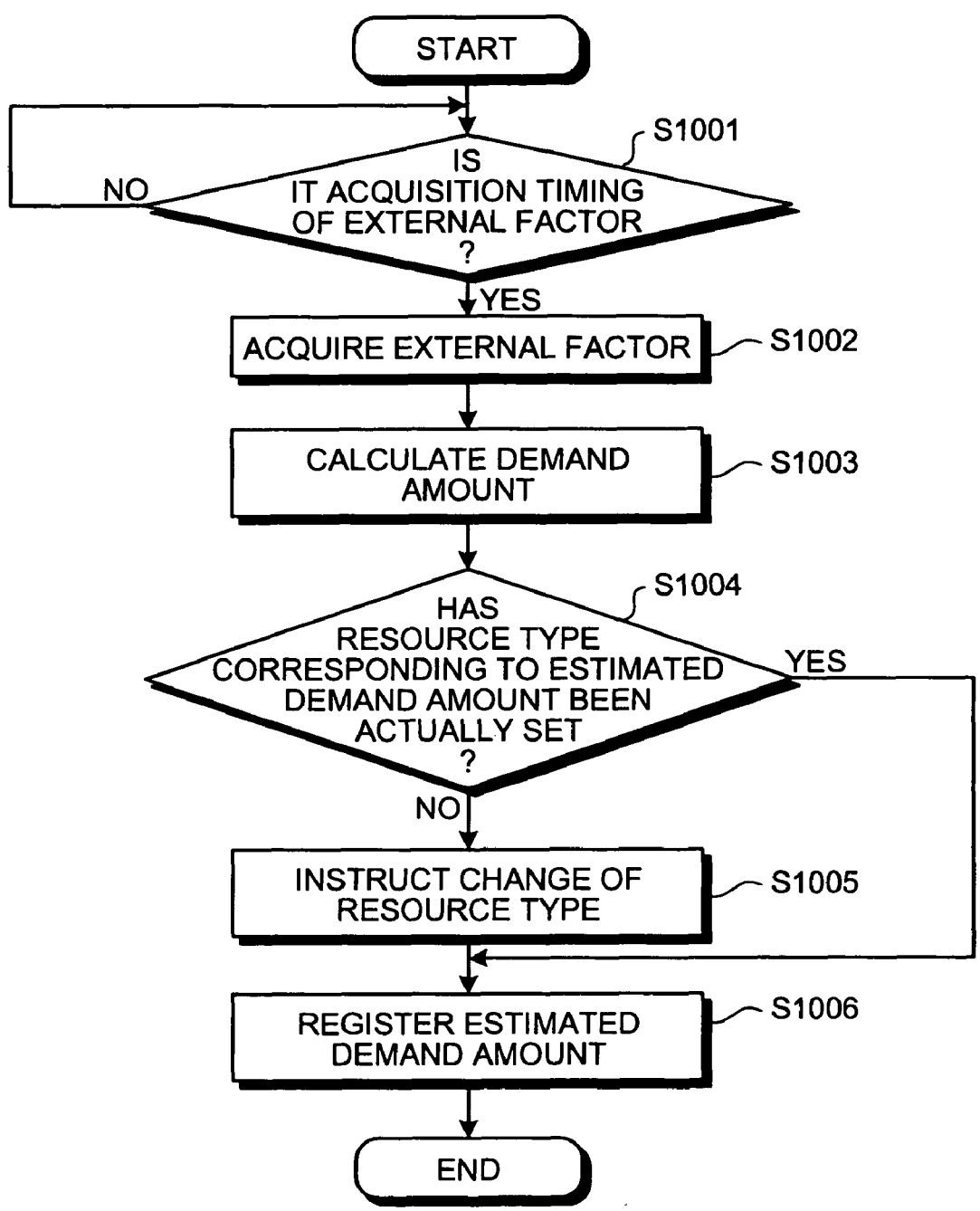
FIG. 10 is a flowchart of demand estimating processing.

FIG. 10 is a flowchart of the demand estimating processing by the demand-estimating server 10. When it is the acquisition timing (for example, every 10 minutes) of the external factor (step S1001: Yes), the demand-estimating server 10 accesses the external site 1 (information source) specified in the external-factor table 12a to acquire the content of the information source as the external factor (step S1002). That is, for example, the demand-estimating server 10 accesses a "national news site" to acquire the "headlines".

The demand-estimating server 10 determines whether the factor (event) specified in the external-factor table 12a has appeared in the information source based on the external factor obtained by the external-factor acquiring unit 13a, to calculate the demand amount (step S1003). That is, as shown in FIG. 6, as for the portal site of company A, when "the name of company A has appeared in the headlines in a local news site", and "company A is in the top ten in the search ranking of the product X in the search site", the respective correlation coefficients "1.5" and "1.0" are added together, to calculate the demand amount "2.5".

The demand-estimating server 10 refers to the resource-management table 12b to determine whether the resource type corresponding to the demand amount calculated at step S1003 is actually set (step S1004). Accordingly, when the resource type corresponding to the demand amount is actually set (step S1004: Yes), the demand-estimating server 10 registers the demand amount calculated at step S1003 in the demand-amount-management table 12c to finish the demand estimating processing (step S1006).

On the other hand, the resource type corresponding to the demand amount is not actually set (step S1004: No), the demand-estimating server 10 outputs a change instruction indicating that the resource type should be changed to the one corresponding to the demand amount to the manager terminal 5 (step S1005), and registers the demand amount calculated at step S1003 in the demand-amount-management table 12c to finish the demand estimating processing (step S1006). That is, as shown in FIG. 7, when "2.5" is calculated as the demand amount with respect to the portal site of company A, and the resource type corresponding thereto is "3", but the actually set resource type is "1", the resource-change instructing unit 13c outputs a change instruction to change the resource type of the portal site of company A to "3" to the manager terminal 5.

Figure 11:
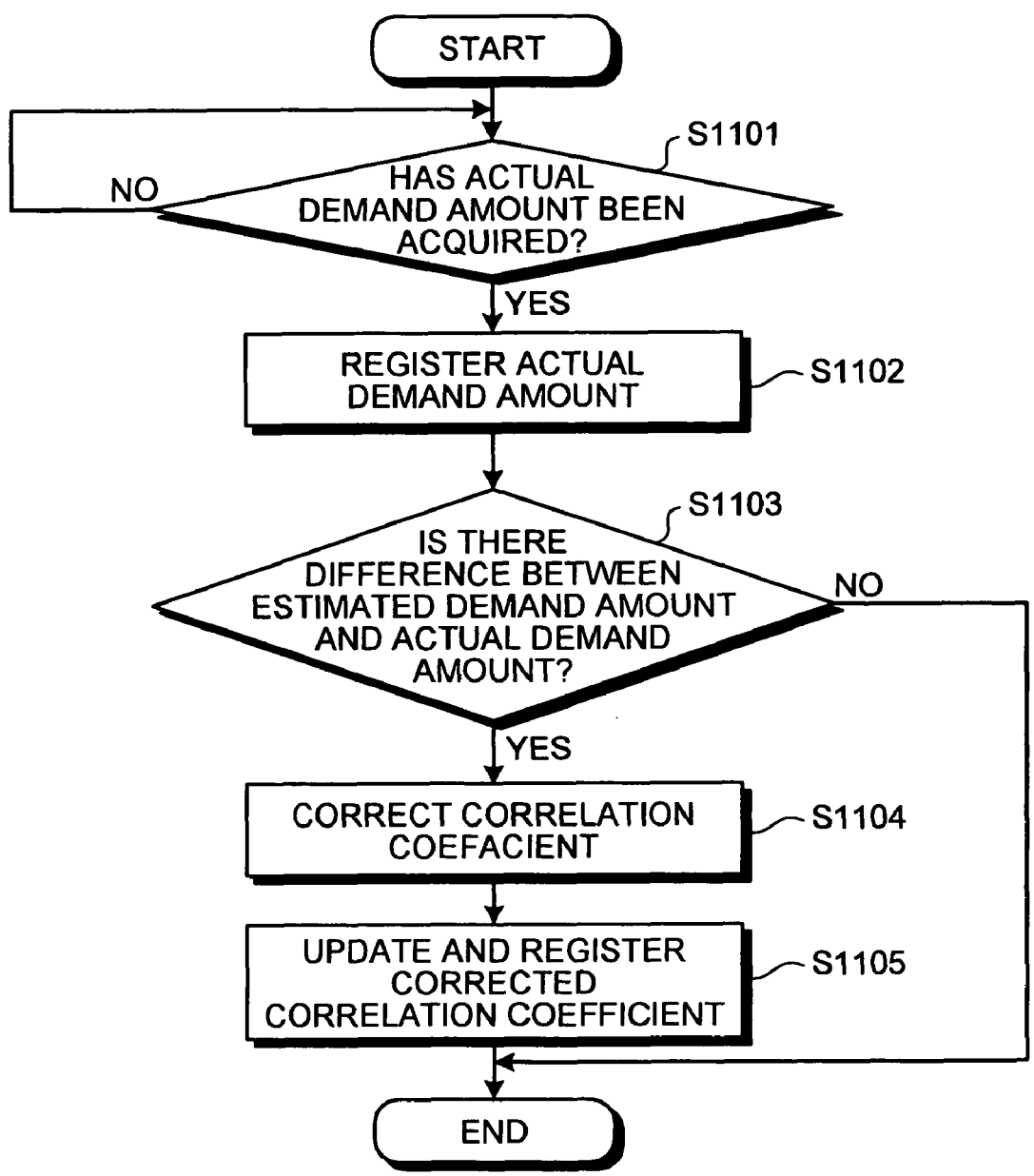
FIG. 11 is a flowchart of correlation-coefficient correction processing.

FIG. 11 is a flowchart of the correlation-coefficient correction processing by the demand-estimating server 10 according to the first embodiment. When the demand-estimating server 10 obtains the actual demand amount on the estimated date and time of the demand amount registered in the demand-amount-management table 12c from the internal site 4 or the manager terminal 5 (step S1101: Yes), the demand-estimating server 10 registers the actual demand amount in the demand-amount-management table 12c (step S1102).

The demand-estimating server 10 then determines whether there is a predetermined difference (for example, a difference exceeding "1.0") between the demand amount registered in the demand-amount-management table 12c and the actual demand amount (step S1103). When there is no predetermined difference (step S1103: No), the demand-estimating server 10 finishes the correlation-coefficient correction processing without performing correction of the correlation coefficients.

On the other hand, when there is the predetermined difference between the demand amount and the actual demand amount (step S1103: Yes), as shown in FIG. 9, the demand-estimating server 10 corrects the correlation coefficients such that the sum total of corrected new correlation coefficients agree with the actual demand amount, by weight-distributing the difference (the difference between the demand amount and the actual demand amount) to the respective correlation coefficients of the factors having affected the calculation of the demand amount, with respect to the service having such a predetermined difference (step S1104). The demand-estimating server 10 updates and registers the corrected new correlation coefficients in the external-factor table 12a to finish the correlation-coefficient correction processing (step S1105).

According to the first embodiment, an event when the information relating to the services appears in a predetermined information source on the network is stored as an external factor affecting the demands for the services on the network, it is determined whether the event has appeared as the external factor to calculate the demand amount, and a resource change is instructed according to the calculated demand amount. Accordingly, for example, even when a product of a certain company has appeared in the news site, thereby suddenly increasing the number of accesses to the company's website, it is immediately instructed to increase the resources allocated to the site, to handle the fluctuations in the demands specific to the network. Accordingly, the demand-estimating server according to the first embodiment can follow today's fluctuating demands that change fast in a complicated manner.

Furthermore, according to the first embodiment, a correlation coefficient indicating the influence on the demands is stored in association with each event relating to the external factor, and the demand amount is calculated by using such a correlation coefficient. Accordingly, for example, the external factors affecting the demands can be quantified, such that as the influence of an event on the demands increases, a larger correlation coefficient is given to the event, and hence, a larger demand amount is calculated. Accordingly, the demand amount can be smoothly calculated.

Moreover, according to the first embodiment, since events are divided according to the size and type of the information source (for example, national site, local site, major website having a large number of accesses, medium sized website having a moderate number of accesses, news site, search site, price comparison site, and the like), the external factors affecting the demands can be quantified, such that as the number of accesses increases, a larger correlation coefficient is given to the site, and hence, a larger demand amount is calculated. Accordingly, the demand amount can be calculated in a detailed manner.

Furthermore, according to the first embodiment, since the demand amount and the actual demand amount with respect to the service are compared to correct the correlation coefficient, for example, when the actual demand amount is larger than the demand amount, the correlation coefficient is corrected to be larger. Thus, the analysis result of the demand amount can be fed back to the correlation coefficient. As a result, the accuracy of demand estimating can be improved.

According to the first embodiment, a case in which the external factors are acquired by accessing the external site 1 (information source) for every predetermined time (for example, every 10 minutes) has been explained. However, the present invention is not limited thereto. For example, the information source can be accessed at a predetermined time interval corresponding to the update timing of the information source or the service-offer time zone in the internal site 4. FIG. 12 is an example of the information stored in the external-factor table. In this case, as shown in FIG. 12, the external-factor table 12a also stores the access timing for each information source, and the external-factor acquiring unit 13a refers to the access timing to access the information source.

If the access to the information source is performed at a predetermined time interval, corresponding to the update timing of the information source or the service-offer time zone, the access to the information source can be performed only when the calculation of the demand amount is necessary (in other words, when there is the possibility of fluctuations in the demands), for example, the access to the information source is performed only at the time of update of the information source, or only in the service-offer time zone. Accordingly, the number of useless accesses to the information source can be reduced.

According to the first embodiment, a case when the resource type corresponding to the demand amount is not actually set, a resource change instruction is output to the manager terminal 5 has been explained. However, the present invention is not limited thereto, and an inquiry as to whether to change the resource type is made to the service provider (for example, respective persons in charge in companies A, S, and W), and a resource change instruction can be output to the manager terminal 5 on condition that the resource change instruction is received from the service provider in response to the inquiry.

Figure 14:
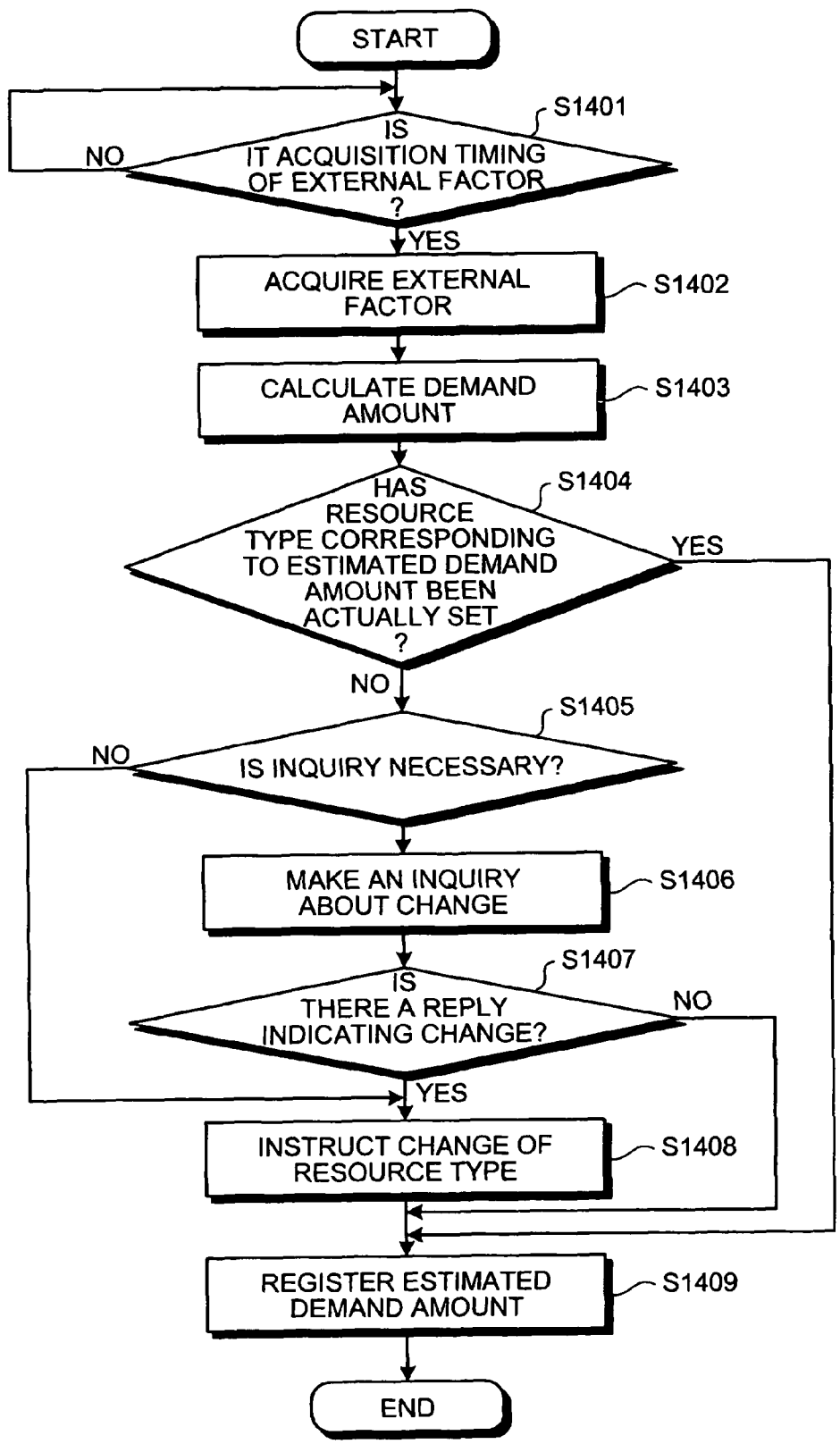
FIG. 14 is another flowchart of the demand estimating processing.

FIG. 13 is an example of information stored in the resource-management table. As shown in FIG. 13, the resource-management table 12*b* stores whether an inquiry is necessary at the time of resource change, and the reference (contact address of the service provider), for each resource type. FIG. 14 is a flowchart of the demand estimating processing in such a case.

As shown in FIG. 14, similarly to the first embodiment, the demand-estimating server 10 acquires an external factor, calculates the demand amount, and determines whether the resource type corresponding to the demand amount has been actually set (steps. S1401 to S1404). If the resource type corresponding to the demand amount has been actually set (step S1404: Yes), the demand-estimating server 10 registers the demand amount in the demand-amount-management table 12*c*, to finish the demand estimating processing (step S1409).

On the contrary, if the resource type corresponding to the demand amount has not been actually set (step S1404: No), the demand-estimating server 10 refers to the resource-management table 12*b* to determine if an inquiry is necessary (step S1405). When the inquiry is not necessary (step S1405: No), the demand-estimating server 10 outputs a change instruction indicating that the resource type should be changed to the one corresponding to the demand amount to the manager terminal 5 (step S1408), and registers the demand amount in the demand-amount-management table 12*c*, to finish the demand estimating processing (step S1409).

On the other hand, if the inquiry is necessary (step S1405: Yes), the demand-estimating server 10 refers to the resource-management table 12*b* to make an inquiry about the resource change, for example, by sending an email to the service provider (step S1406). When there is a response to change the resource type with respect to the inquiry (step S1407: Yes), the demand-estimating server 10 outputs a change instruction involved in the response to the manager terminal 5 (step S1408), and registers the demand amount in the demand-amount-management table 12*c*, to finish the demand estimating processing (step S1409). When there is no response to change the resource type (step S1407: No), the demand-estimating server 10 registers the demand amount in the demand-amount-management table 12*c*, without outputting the resource change instruction, to finish the demand estimating processing (step S1409).

Thus, when it is desired to change the allocation of the resources in view of the demand amount, an inquiry about a change of the resource type is made to the service provider. When a resource change instruction is received from the service provider in response to the inquiry, a resource change is instructed. Accordingly, for example, the service provider can instruct a resource change based on own judgment as to whether the resources should be changed. Furthermore, the service provider can operate such that the fee of the service provider changes according to the resources. In such a case, the service provider can instruct the resource change, considering the fee.

When making an inquiry about the resource change with respect to the service provider, if it is desired to increase the allocation of the resources in view of the demand amount, a disadvantage of not increasing the resources (for example, a loss caused by inaccessibility) can be informed to the service provider. In this case, even the person in charge in the service provider who is not familiar with the resources can precisely instruct the resource change, taking such a disadvantage into consideration.

According to the first embodiment, a case that insufficient and excessive resources are not discriminated, and when the resource type corresponding to the demand amount is not actually set, the resource change instruction is output has been explained. However, the present invention is not limited thereto, and insufficient and excessive resources are discriminated, and an increase instruction at the time of insufficient resources can be output based on the demand amount, but a decrease instruction at the time of excessive resources can be output based on the actual demand amount.

Figure 15:
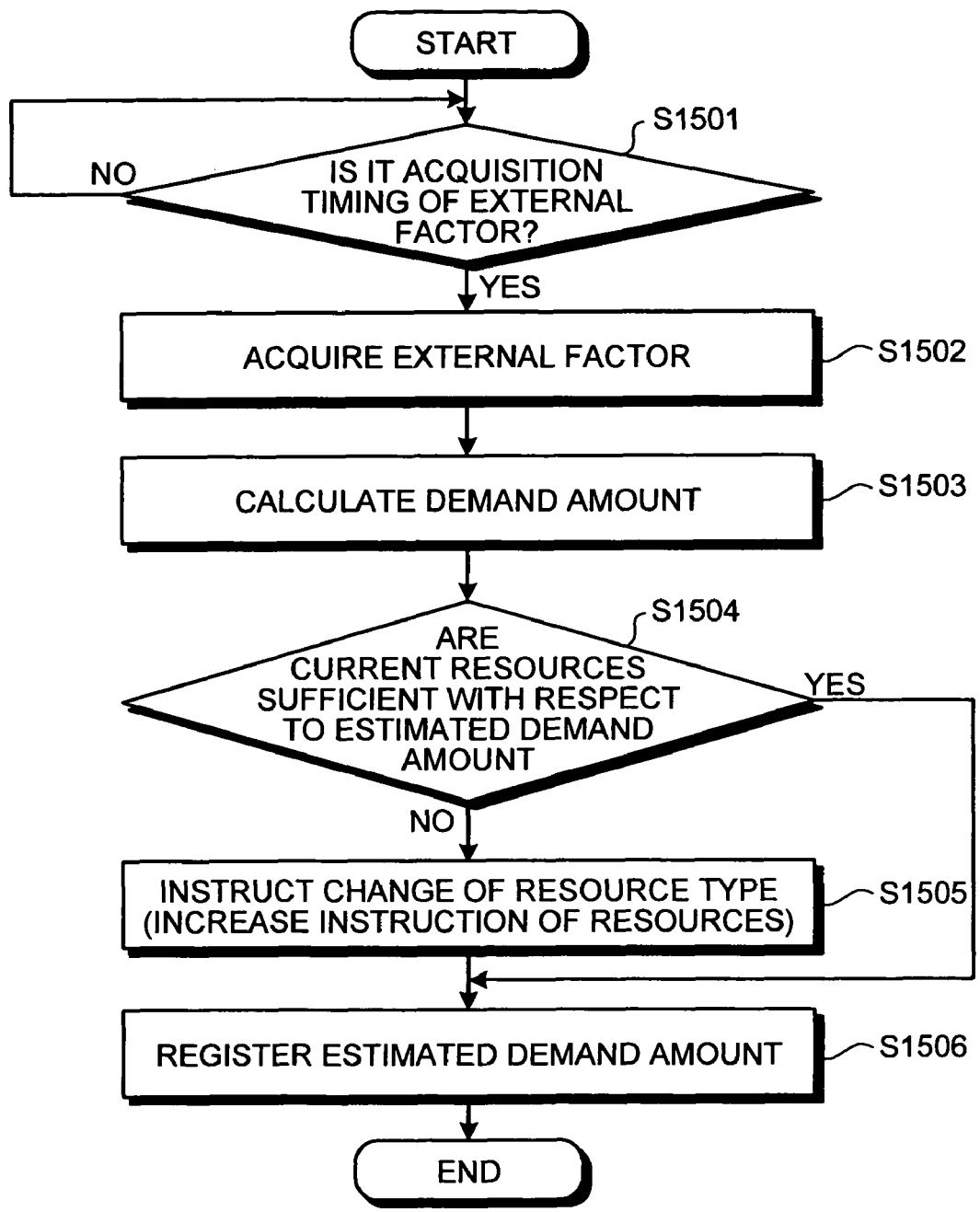
FIG. 15 is still another flowchart of the demand estimating processing.

FIG. 15 is a flowchart of the demand estimating processing (resource increase instruction) in this case. As shown in FIG. 15, the demand-estimating server 10 acquires an external factor and calculates the demand amount (steps S1501 to S1503) as according to the first embodiment. Subsequently, the demand-estimating server 10 does not determine whether the resource type corresponding to the demand amount is actually set, but determines whether the currently set resource type is sufficient based on the demand amount (step S1504).

When the currently set resource type is sufficient (step S1504: Yes), even if the resources are excessive, the demand-estimating server 10 registers the demand amount in the demand-amount-management table 12*c*, without outputting the resource change instruction, to finish the demand estimating processing (step S1506). On the contrary, when the currently set resource type is insufficient with respective to the demand amount (step S1504: No), the demand-estimating server 10 outputs a change instruction indicating that the resource type should be changed to the one corresponding to the demand amount (that is, a resource increase instruction) to the manager terminal 5 (step S1505), and registers the demand amount in the demand-amount-management table 12*c*, to finish the demand estimating processing (step S1506).

Figure 16:
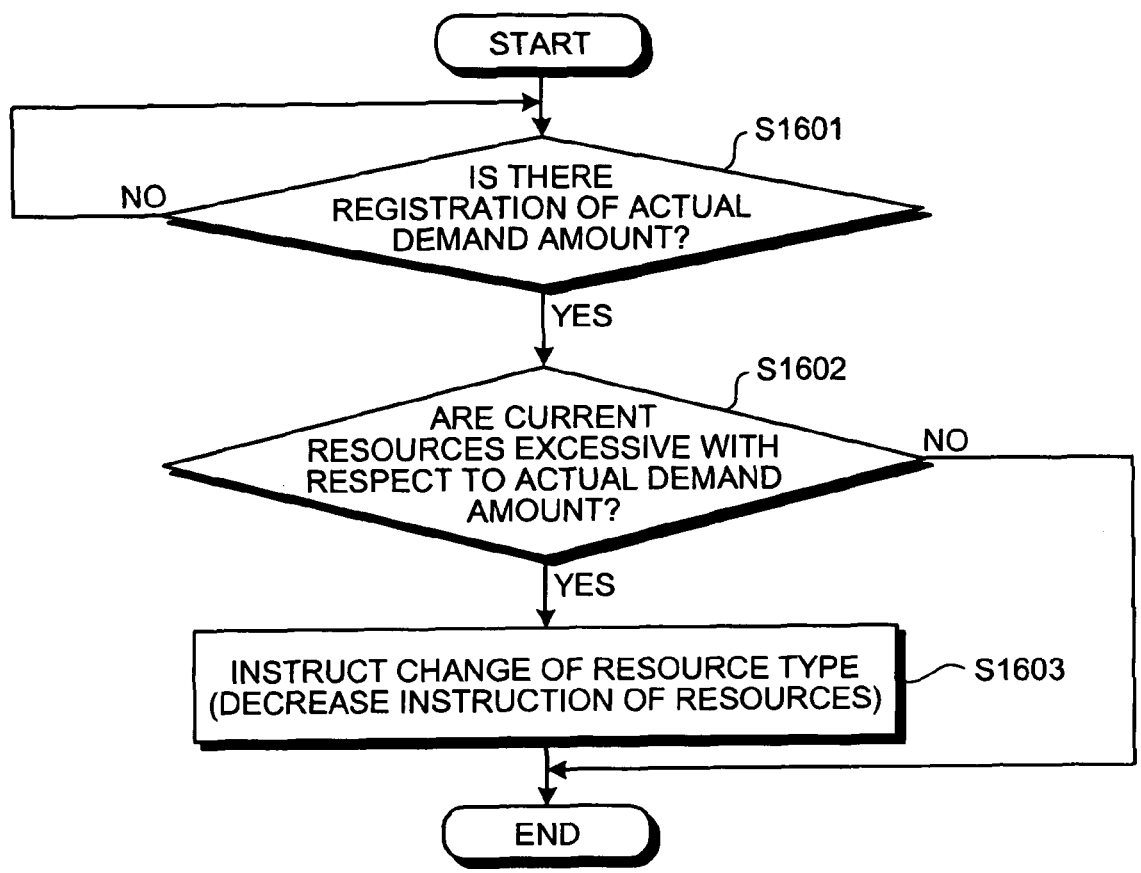
FIG. 16 is a flowchart of a resource decreasing instruction.

FIG. 16 is a flowchart of a resource decrease instruction in the above case. When the actual demand amount is registered in the demand-amount-management table 12*c* (step S1601: Yes), the demand-estimating server 10 determines whether the current resources are excessive with respect to the actual demand amount (step S1602).

When the current resources are not excessive with respect to the actual demand amount (step S1602: No), even if the resources are insufficient, the demand-estimating server 10 finishes the processing without outputting the resource change instruction. On the contrary, when the current resources are excessive with respect to the actual demand amount (step S1602: Yes), the demand-estimating server 10 refers to the resource-management table 12*b* and outputs a change instruction indicating that the resource type should be changed to the one corresponding to the actual demand amount (that is, a resource decrease instruction) to the manager terminal 5, to finish the processing (step S1603).

Thus, if a resource decrease is instructed based on the actual demand amount with respect to the service, the operation can be switched based on increasing fluctuations in demands requiring immediate handling and decreasing fluctuations in demands not requiring immediate handling, for example, such that a resource increase instruction is output before the occurrence of a demand increase based on the demand amount, while a resource decrease instruction is output after the occurrence of a demand decrease based on the actual demand amount. Accordingly, stable resource control can be realized.

According to the first embodiment, a case that the events are divided according to the size and type of the information source and associated with the correlation coefficient has been explained. However, the present invention is not limited thereto. For example, the events can be divided according to the insertion mode of the information relating to the service (for example, the insertion position of company name, the appearing frequency, the character size, the character font, or the color), and associated with the correlation coefficient. In this manner, the external factors affecting the demands can be quantified in a detailed manner, for example, such that as the insertion position is more remarkable, a larger correlation coefficient is provided to calculate a larger demand amount. Accordingly, the demand amount can be calculated in more detail.

According to the first embodiment, a case that the demand amount is calculated by adding the correlation coefficients relating to the external factors has been explained, but the present invention is not limited thereto. For example, the demand amount can be calculated by other calculation methods, for example, by taking a weighted mean of the correlation coefficients of the relevant external factors, or by calculating the demand amount by the number of the relevant external factors without using the correlation coefficient. According to the first embodiment, a case that the demands are estimated by using the external site 1 as the information source has been explained, but the present invention is not limited thereto. For example, the demands can be estimated by using the internal site 4 as the information source, when the factors affecting the demands are in the internal site 4.

According to the first embodiment, a case that the correlation coefficient is corrected based on the registration of the actual demand amount has been explained, but the present invention is not limited thereto. For example, after a plurality of actual demand quantities have been registered in a certain period, the correlation coefficient can be corrected based on the actual demand quantities.

Furthermore, according to the first embodiment, a case that a difference between respective correlation coefficients of factors having affected the calculation of the demand amount (a difference between the demand amount and the actual demand amount) is weight-distributed has been explained. However, the present invention is not limited thereto. For example, the correlation coefficient can be corrected by other methods, such as distributing the difference only to the correlation coefficients of factors, which would have large influence on the demands.

According to the first embodiment, a case that the resource change instruction is output to the external device (the manager terminal 5) of the demand-estimating server 10 has been explained, but the present invention is not limited thereto. For example, the demand-estimating server 10 and the manager terminal 5 can be formed as an integrated unit, so that the resource change instruction is output to an output unit of the demand-estimating server 10.

According to the first embodiment, a case that the resource change operation is prompted by outputting the resource change instruction to the network provider has been explained, but the present invention is not limited thereto. For example, when a predetermined controller automatically changes the resources in the internal site 4, the resource change instruction can be output to the predetermined controller.

Furthermore, according to the first embodiment, a case that one demand-estimating server 10 estimates demands for a plurality of services has been explained, but the present invention is not limited thereto. For example, one demand-estimating server 10 can estimate demands for each service. According to the first embodiment, an example of estimating demands for the services in the internal site 4 has been explained, but the present invention is not limited thereto. For example, demands for services in the external site can be estimated.

The respective constituents of the demand-estimating server 10 shown in FIG. 2 are functionally conceptual, and physically the same configuration is not always necessary. In other words, the specific mode of dispersion and integration of the demand-estimating server 10 is not limited to the illustrated one, and all or a part thereof can be functionally or physically dispersed or integrated in an optional unit, according to the various kinds of load and the status of use. Furthermore, all or an optional part of the various processing functions performed by the demand-estimating server 10 can be realized by a central processing unit (CPU) or a program analyzed and executed by the CPU, or can be realized as hardware by the wired logic.

Of the respective processing explained in this embodiment, all or a part of the processing explained as being performed automatically can be performed manually, or all or a part of the processing explained as being performed manually can be performed automatically in a known method. The information (particularly the information shown in FIGS. 3 to 5) including the processing procedure, the control procedure, specific names, and various kinds of data and parameters shown in the specification or in the drawings can be optionally changed, unless otherwise specified.

The various types of processing explained according to the first embodiment can be realized by executing programs prepared in advance by a computer. Therefore, one example of the computer that executes the demand-estimating program having the same functions as those according to the first embodiment will be explained. FIG. 17 is a diagram of the computer that executes the demand-estimating program.

As shown in FIG. 17, a computer 20 as the demand estimating apparatus is constructed by connecting a communication control IF unit 21, a hard disk drive (HDD) 22, a read only memory (RAM) 23, a random access memory (ROM) 24, and a CPU 25 by a bus 26. The demand-estimating program exhibiting the same functions as those according to the first embodiment, that is, as shown in FIG. 17, an external factor acquisition program 24a, a demand amount calculation program 24b, a resource change instruction program 24c, and a correlation coefficient correction program 24d are stored in advance in the ROM 24. The programs 24a to 24d can be appropriately integrated or dispersed, as the respective constituents of the demand-estimating estimating server 10 shown in FIG. 2.

The CPU 25 reads these programs 24a to 24d from the ROM 24 and executes these programs, and hence, as shown in FIG. 17, the respective programs 24a to 24d function as an external factor acquisition process 25a, a demand-amount calculation process 25b, a resource-change instruction process 25c, and a correlation-coefficient correction process 25d. The respective processes 25a to 25d respectively correspond to the external-factor acquiring unit 13a, the demand-amount calculating unit 13b, the resource-change instructing unit 13c, and the correlation-coefficient correcting unit 13d shown in FIG. 2.

The HDD 22 holds, as shown in FIG. 17, an external-factor table 22a, a resource-management table 22b, and a demand-amount-management table 22c. The respective tables 22a to 22c correspond to the external-factor table 12a, the resource-management table 12b, and the demand-amount-management table 12c shown in FIG. 2. The CPU 25 reads the factor data and the correlation coefficient data to be processed from the HDD 22, stores these data in the RAM 23 temporarily, creates demand amount data by using the temporarily stored data, and executes processing for registering the demand amount data and the actual demand amount data temporarily stored in the RAM 23 in the HDD 22.

The respective programs 24a to 24d are not necessarily stored in the ROM 24 initially, and for example, these programs can be stored in a "portable physical medium" such as a flexible disk (FD), a CD-ROM, a magneto-optical (MO) disk, a digital versatile disk (DVD) disk, a magneto-optical disk, or an integrated circuit (IC) card, inserted into the computer 20, a "fixed physical medium" such as the HDD equipped inside or outside of the computer 20, or "another computer (or a server)" connected to the computer 20 via a public line, the Internet, the LAN, or a wide area network (WAN), and the computer 20 can read and execute the respective programs. That is, a CD-ROM storing the programs for the demand estimating apparatus as shown according to the first embodiment can be distributed, and the computer 20 can read and execute the programs stored in the CD-ROM.

According to the present invention, even when a product of a certain company appears on a news site, and the number of accesses with respect to the site of the company suddenly increases, an instruction to increase the resources allocated to the company is immediately output, thereby enabling correspondence to the fluctuations in demands specific to the network, and Accordingly, enabling following today's fluctuating demands that change fast in a complicated manner.

Furthermore, according to the present invention, external factors affecting the demands can be quantified such that as the influence on the demands increases, a larger correlation coefficient is given to the event, thereby calculating a larger demand amount. Accordingly, the demand amount can be smoothly calculated. Furthermore, events are divided according to the insertion mode of information relating to the service (for example, the insertion position of company name, the appearing frequency, the character size, the character font, or the color), and the size and type of the information source (for example, national site, local site, major website having a large number of accesses, medium-sized website having a moderate number of accesses, news site, search site, price comparison site, and the like), and associated with the correlation coefficient. Accordingly, the external factors affecting the demands can be quantified in a detailed manner, for example, such that as the insertion position is more remarkable, a larger correlation coefficient is provided to calculate a larger demand amount. Accordingly, the demand amount can be calculated in more detail.

Moreover, according to the present invention, the service provider can instruct a resource change based on own judgment as to whether the resources should be changed. The service provider can operate such that the fee of the service provider changes according to the resources. In such a case, the service provider can instruct the resource change, considering the fee.

Furthermore, according to the present invention, even a person in charge in the service provider is not familiar with the resources can precisely instruct the resource change, considering such a disadvantage.

Moreover, according to the present invention, when the actual demand amount is larger than the demand amount, the correlation coefficient is corrected to be larger. Thus, the analysis result of the demand amount can be fed back to the correlation coefficient. Accordingly, the accuracy of demand estimating can be improved.

Furthermore, according to the present invention, the access to the information source can be performed only when the calculation of the demand amount is necessary (in other words, when there is the possibility of fluctuations in the demands), for example, access to the information source is performed only at the time of update of the information source, or only in the service-offer time zone. Accordingly, the number of useless accesses to the information source can be reduced.

Moreover, according to the present invention, the operation can be changed according to increasing fluctuations in demands requiring immediate handling and decreasing fluctuations in demands not requiring immediate handling, for example, such that a resource increase instruction is output before occurrence of a demand increase based on the demand amount, while a resource decrease instruction is output after occurrence of a demand decrease based on the actual demand amount. Accordingly, stable resource control can be realized.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for estimating a demand for a service offered via a network, the apparatus comprising:
    an external-factor storing unit to store an event for a case in which information relating to the service appears in a predetermined information source on the network, as an external factor affecting the demand;
    a demand-amount calculating unit to calculate an amount of the demand for the service by determining whether the event as the external factor stored is appeared in the predetermined information source; and
    a resource-change instructing unit to instruct a change of a resource allocated to the service, according to the amount of the demand calculated, wherein
    the external-factor storing unit to further store a correlation coefficient that indicates a degree of an influence of the external factor on the demand, in an associated manner, for every event divided based on at least an insertion mode of the information relating to the service in the predetermined information source, and
    the demand-amount calculating unit to calculate the amount of the demand by using the correlation coefficient stored;
    the insertion mode of the information relating to the service in the predetermined information source includes an insertion position, a font size or a color of a company name related to the service and an appearing frequency of the company name.

2. The apparatus according to claim 1, further comprising a resource-change inquiry unit that makes, when it is desired to change an allocation of the resource based on the amount of the demand calculated, an inquiry for a change of the resource to a service provider, wherein
    when an instruction for a resource change is received from the service provider in response to the inquiry, the resource-change instructing unit instructs the change of the resource allocated to the service.

3. The apparatus according to claim 2, wherein when it is desired to increase the allocation of the resource based on the amount of the demand calculated, the resource-change inquiry unit informs the service provider of a disadvantage that is to occur when the resource is not increased.

4. The apparatus according to claim 1, further comprising a correlation-coefficient correcting unit that corrects the correlation coefficient stored, by comparing the amount of the demand calculated with an actual amount of the demand for the service.

5. The apparatus according to claim 1, wherein the demand-amount calculating unit accesses the predetermined information source at a predetermined time interval, according to at least one of an update timing of the information source and a service-offer time zone, to determine whether the event as the external factor is appeared in the information source.

6. The apparatus according to claim 1, wherein the resource-change instructing unit instructs to decrease the resource allocated to the service based on an actual amount of the demand for the service.

7. A method estimating a demand for a service offered via a network, the method comprising:
calculating an amount of the demand for the service by determining whether an event, stored as an external factor affecting the demand, for a case in which information relating to the service is appeared in a predetermined information source on the network using a correlation coefficient stored; and
instructing a change of a resource allocated to the service, according to the amount of the demand calculated, wherein
the correlation coefficient indicates a degree of an influence of the external factor on the demand, in an associated manner, for every event divided based on at least an insertion mode of the information relating to the service in the predetermined information source;
the insertion mode of the information relating to the service in the predetermined information source includes an insertion position, a font size or a color of a company name related to the service and an appearing frequency of the company name.

8. The method according to claim 7, further comprising:
inquiring, when it is desired to change an allocation of the resource based on the amount of the demand calculated, of a service provider a change of the resource; and wherein,
when an instruction for a resource change is received from the service provider in response to the inquiring, the instructing includes instructing the change of the resource allocated to the service.

9. The method according to claim 8, wherein when it is desired to increase the allocation of the resource based on the amount of the demand calculated, the inquiring includes informing the service provider of a disadvantage that is to occur when the resource is not increased.

10. The method according to claim 7, further comprising:
correcting the correlation coefficient stored, by comparing the amount of the demand calculated with an actual amount of the demand for the service.

11. The method according to claim 7, wherein the calculating includes accessing the predetermined information source at a predetermined time interval, according to at least one of an update timing of the information source and a service-offer time zone, to determine whether the event as the external factor is appeared in the information source.

12. The method according to claim 7, wherein the instructing includes instructing to decrease the resource allocated to the service based on an actual amount of the demand for the service.

13. A non-transitory computer-readable recording medium that stores a computer program for estimating a demand for a service offered via a network, wherein the computer program causes a computer to execute
calculating an amount of the demand for the service by determining whether an event, stored as an external factor affecting the demand, for a case in which information relating to the service is appeared in a predetermined information source on the network using a correlation coefficient stored; and
instructing a change of a resource allocated to the service, according to the amount of the demand calculated, wherein
the correlation coefficient indicates a degree of an influence of the external factor on the demand, in an associated manner, for every event divided based on at least an insertion mode of the information relating to the service in the predetermined information source;
the insertion mode of the information relating to the service in the predetermined information source includes an insertion position, a font size or a color of a company name related to the service and an appearing frequency of the company name.

14. The non-transitory computer-readable recording medium according to claim 13, further comprising inquiring, when it is desired to change an allocation of the resource based on the amount of the demand calculated, of a service provider a change of the resource, wherein
when an instruction for a resource change is received from the service provider in response to the inquiring, the instructing includes instructing the change of the resource allocated to the service.

15. The non-transitory computer-readable recording medium according to claim 14, wherein when it is desired to increase the allocation of the resource based on the amount of the demand calculated, the inquiring includes informing the service provider of a disadvantage that is to occur when the resource is not increased.

16. The non-transitory computer-readable recording medium according to claim 13, further comprising correcting the correlation coefficient stored, by comparing the amount of the demand calculated with an actual amount of the demand for the service.

17. The non-transitory computer-readable recording medium according to claim 13, wherein the calculating includes accessing the predetermined information source at a predetermined time interval, according to at least one of an update timing of the information source and a service-offer time zone, to determine whether the event as the external factor is appeared in the information source.

18. The non-transitory computer-readable recording medium according to claim 13, wherein the instructing includes instructing to decrease the resource allocated to the service based on an actual amount of the demand for the service.

* * * * *